United States Patent
Beatty et al.

(10) Patent No.: US 8,612,604 B2
(45) Date of Patent: Dec. 17, 2013

(54) SYSTEM AND METHOD FOR SERVER INITIATION BEACON

(75) Inventors: Kevin Beatty, Elmira (CA); Rastislav Hodul, Port Moody (CA)

(73) Assignee: Psion, Inc., Mississauga (CA)

(*) Notice: Subject to any disclaimer, the term of this patent is extended or adjusted under 35 U.S.C. 154(b) by 551 days.

(21) Appl. No.: 12/253,660

(22) Filed: Oct. 17, 2008

(65) Prior Publication Data
US 2010/0100582 A1 Apr. 22, 2010

(51) Int. Cl.
G06F 15/16 (2006.01)
G06F 15/173 (2006.01)
H04W 4/00 (2009.01)

(52) U.S. Cl.
USPC ............... 709/227; 709/223; 370/328

(58) Field of Classification Search
USPC ......... 709/204, 205, 227–229, 248; 370/328; 455/518–519; 434/118
See application file for complete search history.

(56) References Cited

U.S. PATENT DOCUMENTS

| | | | |
|---|---|---|---|
| 2002/0156875 A1* | 10/2002 | Pabla | 709/220 |
| 2003/0221004 A1* | 11/2003 | Stupek et al. | 709/224 |
| 2004/0267876 A1* | 12/2004 | Kakivaya et al. | 709/200 |
| 2006/0184660 A1* | 8/2006 | Rao et al. | 709/224 |
| 2007/0100967 A1* | 5/2007 | Smith et al. | 709/219 |
| 2007/0197262 A1* | 8/2007 | Smith et al. | 455/562.1 |
| 2008/0298308 A1* | 12/2008 | Hannu et al. | 370/328 |

* cited by examiner

*Primary Examiner* — Peling Shaw
(74) *Attorney, Agent, or Firm* — Randi L. Karpinia

(57) ABSTRACT

A method and system for a server-client communication in a network, is provided. The method includes, at a server: (1) requesting a client to establish an initial connection for discovery, including: generating a discovery beacon for requesting the initial connection, and transmitting the discovery beacon in the network; and (2) requesting the discovered client to establish a further connection for updates, including: generating at least one of an update beacon for requesting the further connection and an event for triggering the further connection, and transmitting the at least one of the update beacon and the event in the network.

24 Claims, 6 Drawing Sheets

SYSTEM AND METHOD FOR SERVER INITIATION BEACON

FIELD OF INVENTION

The present invention relates to a server-client network architecture, more specifically to a method and system for inviting connections from servers to clients.

BACKGROUND OF THE INVENTION

Wireless networks can provide various services to users in a network. Such services include, for example, updating components of client terminals (e.g., installation of applications or software products). Conventionally, it is required to initiate announcement beacons from each client terminal to get a contact with a server and receive the services from the server. However, such client initiating announcement beacons would increase traffic in the network. In addition, it is difficult to manage a group of clients from the server.

Therefore, there is a need to discovering and updating client terminals remotely and cost-effectively, without increasing the network traffic. Further, it is desirable that a group of clients are remotely and cost-effectively managed.

SUMMARY OF THE INVENTION

It is an object of the invention to provide a server-client network architecture that obviates or mitigates at least one of the disadvantages of existing systems.

According to an aspect of the present invention there is provided a method which includes, at a server: (1) requesting a client to establish an initial connection for discovery, including: generating a discovery beacon for requesting the initial connection, and transmitting the discovery beacon in the network; and (2) requesting the discovered client to establish a further connection for updates, including: generating at least one of an update beacon for requesting the further connection and an event for triggering the further connection, and transmitting the at lease one of the update beacon and the event in the network.

According to another aspect of the present invention there is provided a method which includes, at a client: for discovery, detecting a discovery beacon from a server for establishing an initial connection, and establishing the initial connection, and for updates, detecting at least one of an update beacon from the server for establishing a further connection and an event for establishing the further connection, and establishing the further connection.

According to a further aspect of the present invention there is provided a server system includes: an invitation unit for generating and transmitting a discovery beacon for discovering a new client in a network, and generating and transmitting at least one of an update beacon and an event for updating the discovered client in the network; and an administration unit for administering the discovered client, including at least one of: assigning the discovered client to a group; and assigning the server to the client to allow the client to respond to the discovery and update beacons from the assigned server.

According to a further aspect of the present invention there is provided a client system includes: a beacon client for detecting an invitation beacon from a server, the invitation beacon including a discovery beacon for discovery and an update beacon for updates; an event identifier for detecting an event for the updates; a primary connection client for establishing an initial connection in response to the discovery beacon and establishing a further connection in response to at least one of the update beacon and the event.

BRIEF DESCRIPTION OF THE DRAWINGS

These and other features of the invention will become more apparent from the following description in which reference is made to the appended drawings wherein.

DETAILED DESCRIPTION

One or more currently preferred embodiments have been described by way of example. It will be apparent to persons skilled in the art that a number of variations and modifications can be made without departing from the scope of the invention as defined in the claims.

Figure 1:
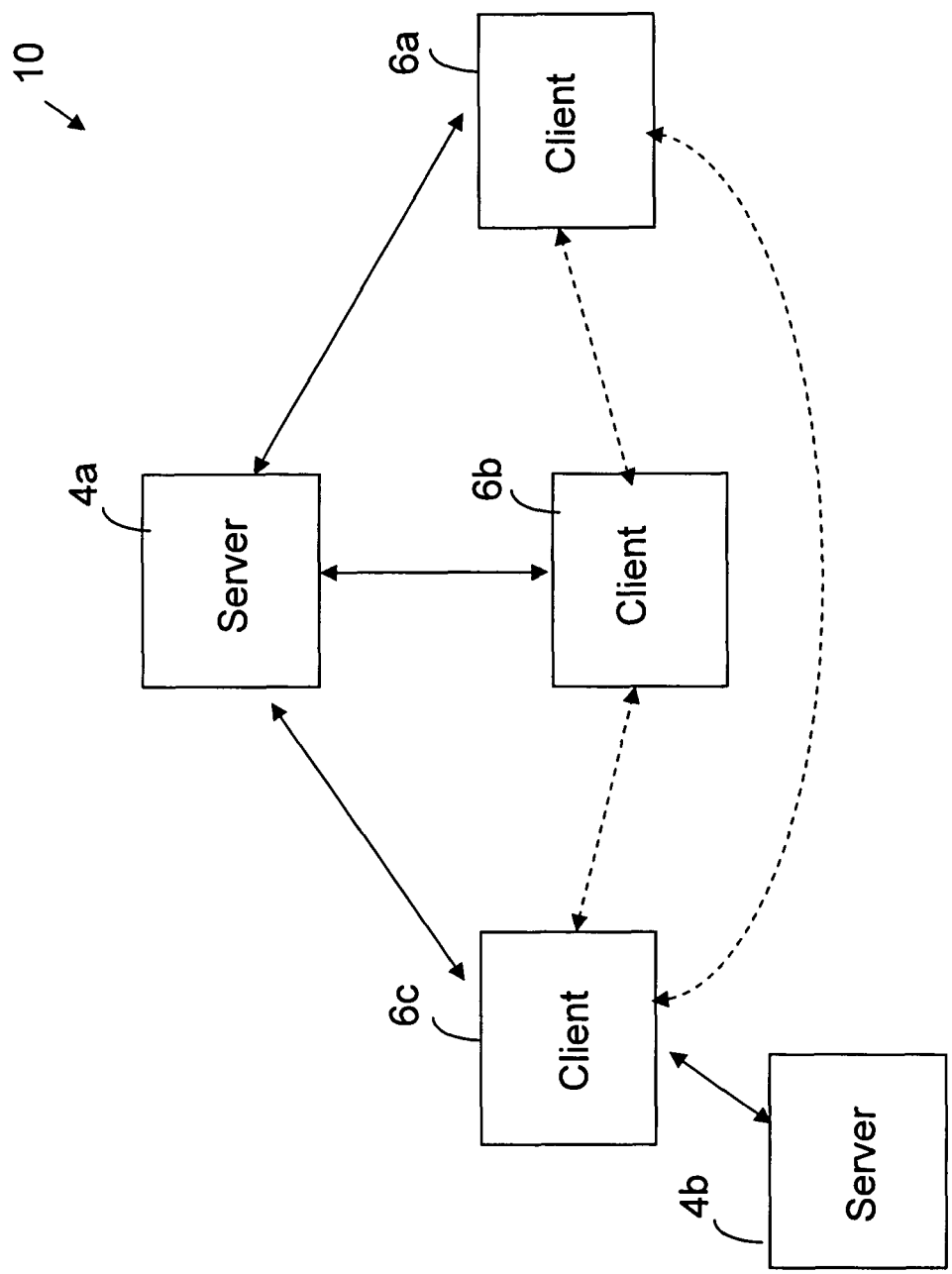
FIG. 1 is a block diagram showing a network system in accordance with an embodiment of the present invention.

Referring to FIG. 1, a network system in accordance with an embodiment of the present invention is described. The network system 10 of FIG. 1 forms a closed network where at least one server remotely discovers and manages at least one client terminal. The network system 10 has a terminal discovery mechanism for discovering new client terminals in the network and providing an initial deployment to the newly discovered client terminals, and an update mechanism for updating the discovered client terminals. These mechanisms are initiated by invitation beacons from the servers. The network system 10 applies a one sender/many listener scheme, which reduces the network usage.

In FIG. 1, two servers 4a and 4b and three client terminals 6a, 6b and 6c are illustrated. However, the number of the servers and client terminals in the network may vary. The network may be a wireless network or a wired network. The client terminals 6a, 6b and 6c may be mobile terminals. In the description, the term "server" and "host" are used interchangeably. In the description, the term "client", "terminal" and "client terminal" are used interchangeably. In the description, the term "administrator", "operator" and "user" may be used interchangeably.

The invitation beacons include a discovery beacon. The discovery beacon requests a client terminal (e.g., 6c) to establish an initial connection with a server (e.g., 4a) in the network. The discovery beacon provides the means to send the connection information for a more advanced connection (for updates) to client terminals remotely. Through the initial connection, information on the client terminals may be provided to the server.

The invitation beacons include an update beacon. The update beacon requests the discovered client terminal (e.g., 6c) to establish a further (advanced) connection to a server (e.g., 4a or 4b) in the network, for updates. The discovered client terminal may establish the advanced connection with a server in response to some events identified by that client terminal. Using the advanced connection, the server may provision and configure the discovered client terminals.

When the client terminals are discovered initially, they are identified as the "unassigned group" in the server. Each discovered client terminal in the unassigned group is assigned to one or more groups. Once the client terminal is assigned to the respective group(s), then the client terminal is updated on a group basis. The client terminal in a group may be moved to another group by sending a new discovery beacon or an update beacon to the former group.

The arrangement of a group allows one or more discovered client terminals to be targeted for updates. In one example, the group can be used as a functional unit that ties a set of components (e.g., files) or data to a set of client terminals. In this example, a set of components is downloaded to the client terminals in a group. One component may be assigned to zero to many groups. A set of the client terminals in the group may exchange data with the server.

Using the server, an administrator manages the group (e.g., creating groups, modifying groups, and deleting groups), and the invitation beacons (e.g., transmitting the beacons, stopping the beacons), components and data transferred to the client terminals.

In one example, a server transmits a discovery beacon and provides, to a client terminal, a locator of that server or another server to establish an initial connection and/or an advanced connection. A DNS address (for example, www.example.com) may be provided to the client terminals as the locator of a server, without providing a statically assigned IP address.

The locator of a server may include URL identifying a specific web server. In one example, the URL may be provided to the client terminal through the discovery beacon only. The network system 10 can support any current or future security mechanism over IP as this is the responsibility of the connection referenced by the URL in the discovery beacon, not the beacon itself.

Figure 2:
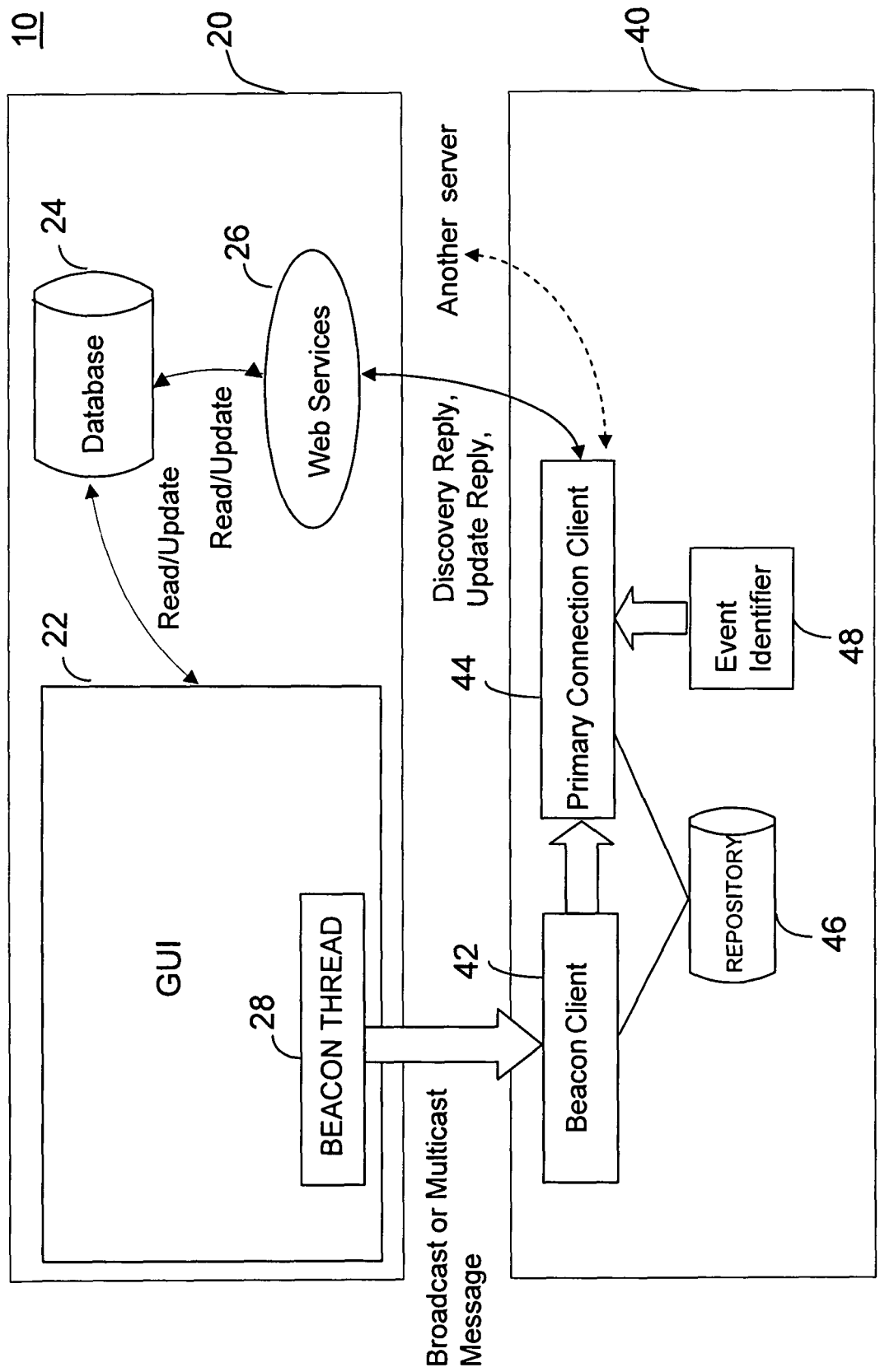
FIG. 2 is a schematic diagram showing a server and a client in the network system of FIG. 1.

Referring to FIG. 2, the network system 10 of FIG. 1 is described in detail. In the network system 10A of FIG. 2, a server 20 and a client terminal 40 are illustrated. The server 20 corresponds to each of the servers 4a and 4b of FIG. 1. The client terminal 40 corresponds to each of the client terminals 6a, 6b and 6c of FIG. 1. It would be appreciated by one of ordinary skill in the art that the network system 10A may include more than one server 20 and more than one client terminal 40.

The server 20 includes a visual user interface (GUI) 22, a database 24, and a Web service module 26. It would be appreciated by one of ordinary skill in the art that the server 20 may contain additional functions/elements/mechanisms other than those illustrated in FIG. 2. The server 20 communicates with the client terminal 40 through various interfaces including, for example, but not limited to, wireless connections via a secure or non-secure WLAN, WWAN or BlueTooth.

The GUI 22 supports various functionalities, for example, client terminal and group maintenance, beacon configuration including start/stopping a beacon thread 28, and component/data maintenance.

The discovery and update beacon messages are transmitted from the beacon thread 28. The beacon port is unidirectional from the server 20 to the client terminal 40 only. There is no client response on the beacon port.

Using the GUI 22, the user manages transmitting/stopping discovery beacons and update beacons. The beacons may be multicasted or broadcasted. The discovery beacon may be sent out periodically until that action is stopped by the server 20. The update beacon may be sent out periodically until that action is stopped by the server 20 or all the targeted (group) client terminals take an action in response to the update beacon. Each beacon has a server ID identifying a beacon owner, i.e., a server as described below (e.g., Site ID of FIG. 3).

Once the client terminal 40 responds to the discovery beacon, it is added into a management list in the database 24. The client terminal 40 may transfer, to the web service module 26, information on that client terminal, including, for example, its serial number, operating system, device model number, terminal ID, IP addresses, or terminal name so that the discovered client terminal is uniquely identified by any of these information elements.

The database 24 stores various information/data. Entities of the database 24 include, for example, but not limited to, a terminal and a group managed by the server 20 and component/data for updates. The database 24 is read or updated via the GUI 22 and the Web service module 26.

The Web service module 26 provides various Web services to the client terminal 40. The server 20 acts as a Web server (26) whose location is identified by URL. The client terminal 40 locates the Web service 26 of the server 20 or another server, using the URL provided from the server 20.

In one example, the URL may be provided only through the discovery beacon from the server 20. In this example, the client terminal 40 establishes initial and advanced connections, using the URL in the discovery beacon.

In another example, a new URL may be provided after the establishment of the initial connection with the server, by sending another discovery beacon with the new URL. The client terminal 40 responds to the new discovery beacon that matches the server ID of the initial discovery beacon.

In FIG. 2, the client terminal 40 connects to the Web service module 26 of the server 20 in response to the beacons from the server 20. However, in a further example, the URL may be directed to another server, other than the server 20. In this example, the client terminal 40 will not respond to the server 20.

The client terminal 40 includes a beacon client 42, a primary connection client 44, a repository 46, and an event identifier 48. It would be appreciated by one of ordinary skill in the art that the client terminal 40 may contain additional functions/elements/mechanisms other than those illustrated in FIG. 2.

The beacon client 42 detects the invitation beacons from the server 20 and invokes a primary connection client 44. The beacon client 42 includes a beacon listener that is always active and is responsible for launching the primary connection client 44 when a beacon requests the client terminal 40 to establish a connection with a server.

The client terminal 40 establishes a connection with the web server identified by the URL, through the primary connection client 44. For updates, the client terminal 40 may reuse a previously used server URL. The URL may be stored in the repository 46.

The event identifier 48 detects some events and launches the primary connection client 44. The events identified by the event identifier 48 may include, for example, but not limited to, a scheduled event (alarm), a docking event, power on etc. The scheduled event may be set by the client terminal 40 or the server 20. For example, an updating period is assigned by the server 20 once the client terminal 40 is discovered, so that the client terminal 40 connects back to the server 20 at a certain timing. The scheduled event is detected, for example, by a timer in the event identifier 48.

Figure 3:
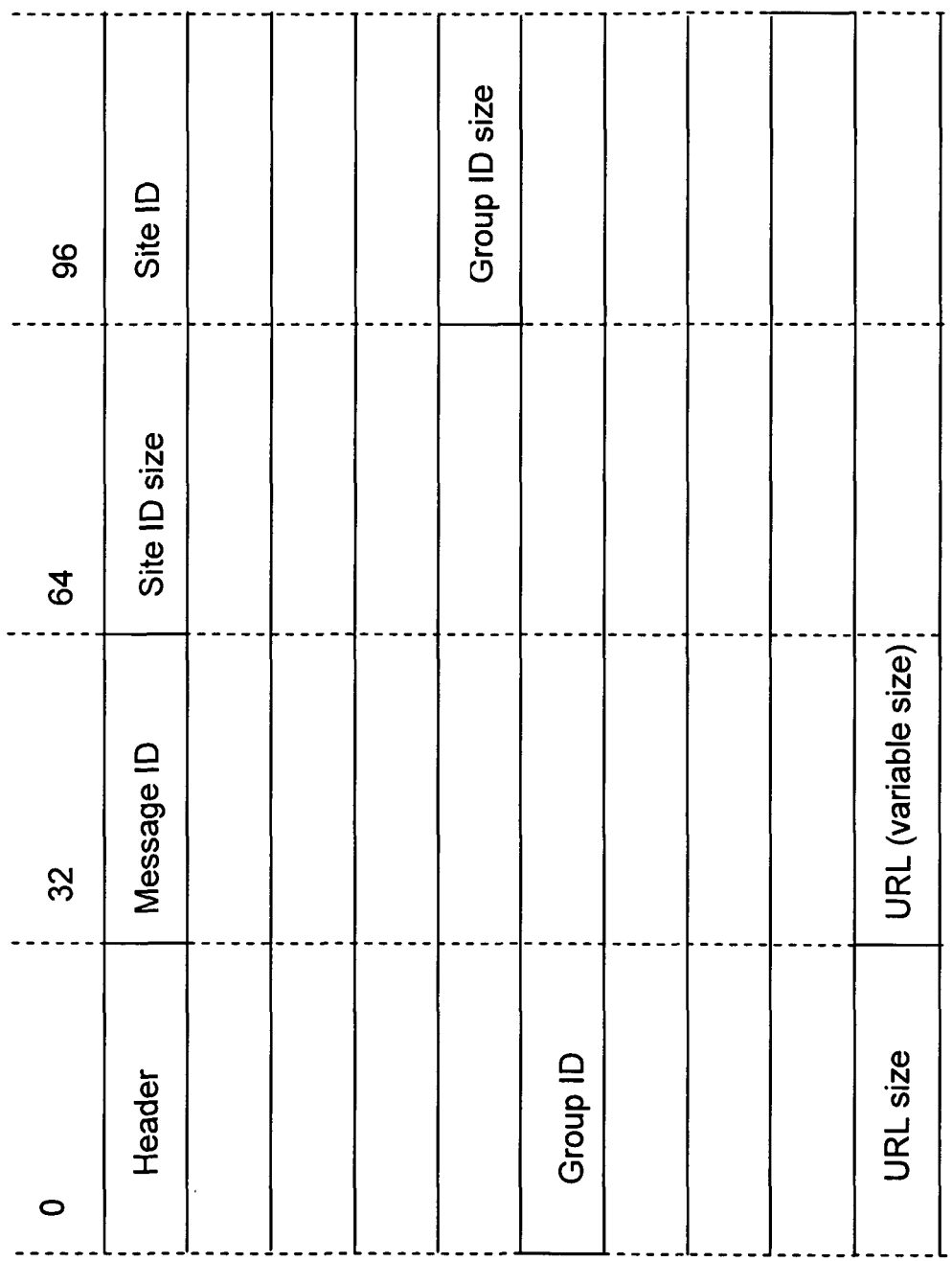
FIG. 3 is a schematic diagram showing an invitation beacon from the server.

Referring to FIG. 3, the invitation beacon sent out from the beacon thread 28 is described in detail. The invitation beacon has, for example, the following format: a header, a message ID, Site ID size, Site ID, Group ID size, Group ID, URL size, and URL.

The message ID is an identifier of the beacon. This is used to prevent the client terminal (40 of FIG. 2) from acting on same beacon more than once. When a beacon (discovery, update beacon) is created it is assigned a message ID. For example, this beacon with the message ID is sent out periodically while more client terminals power up. The client terminal will ignore a beacon if it has the same message ID as the last beacon it received.

The Site ID defines the Site ID for the server (20 of FIG. 2). A different server has a different Site ID. The Site ID is assigned to all new and unassigned client terminals upon initial contact. Once assigned, the client terminal respond to both discovery and update beacons that have the same Site ID. The Site ID can be used to prevent a discovered client terminal from responding to another server and prevent any client terminal from responding a second time to a repeated discovery beacon. A client terminal that has never received a discovery beacon may have a blank Site ID. A client terminal without the site name set will respond to any site name. The Site ID size defines the size of the Site ID, and is used, for example, for data integrity checking.

The Group ID defines a group of client terminals and is assigned by the server. This has a specific value (e.g., empty) for the discovery beacons. It is used to force an update for a specific group of client terminals. The Group ID size defines the size of the Group ID of the server 20 and is used, for example, for data integrity checking.

The URL specifies the URL to be connected during discovery. This has a specific value (e.g., zero) for non-discovery beacons (e.g., update beacon). No data is sent for non-discovery beacon messages. The client terminal may re-use the same URL for updates. The URL size specifies the size of the URL, and is used, for example, for data integrity checking.

When discovering a new client terminal, the Site ID is likely to remain constant while the URL may change as a new discovery beacon having the new URL may be provided to the client terminal from the same server.

The Site ID provides a mechanism for identifying the server to which the client terminal responds in a way other than the URL. The Site ID also can be used to allow multiple servers to exist on a single network.

IP address may be configured on a beacon to which the beacon will be sent. The IP address may be one of a global broadcast, subnet broadcast, multicast, or specific IP address.

Figure 4:
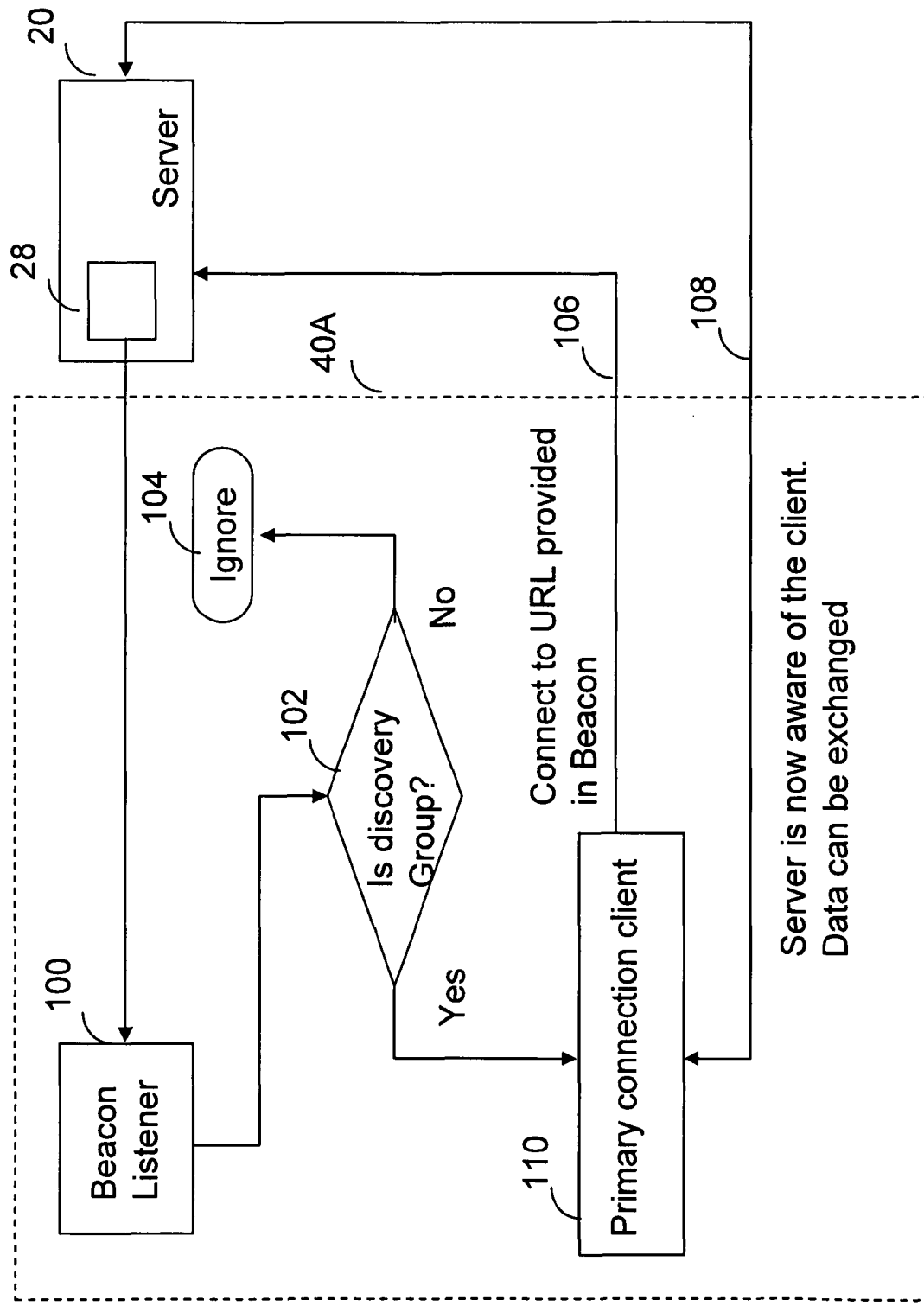
FIG. 4 is a schematic diagram showing an example of a discovery process in the network of FIG. 2.

Referring to FIG. 4, one example of a client discovery process using the discovery beacon is described in detail. In FIG. 4, "40A" corresponds to the client terminal 40 of FIG. 2. One of ordinary skill in the art would appreciate that the client terminal 40A includes functionalities/elements not illustrated in FIG. 4. The server 20 initiates a discovery beacon and sends it out to discover new client terminals (or group).

The client terminal 40A includes a beacon listener 100. The beacon listener 100 is in the beacon client 42 of FIG. 2. A beacon sent out by the server 20 is detected by the beacon listener 100.

It is assumed that the client terminal 40A does not have a configured Group ID(s) at step 102. The client terminal 40A checks whether this beacon is to discover a new client terminal. In one example, if the Group ID size in the beacon is, for example, zero, it is determined that the detected beacon is a discovery beacon.

If the client terminal 40A having no configured Group ID determines that the detected beacon is not a discovery beacon, it ignores the detected beacon (104). In addition, if the client terminal 40A has already responded to the same beacon, it ignores the detected beacon (104). This is done by comparing the message ID for the detected beacon to the message ID of the last discovery beacon.

If the client terminal 40A having no configured Group ID determines that the detected beacon is a discovery beacon, it invokes a primary connection client (110) with the URL from the beacon provided as a command line argument (106). The primary connection client 110 corresponds to the primary connection client 44 of FIG. 2. The URL is provided as an argument to the primary connection client so that it may connect to the server 20.

Figure 5:
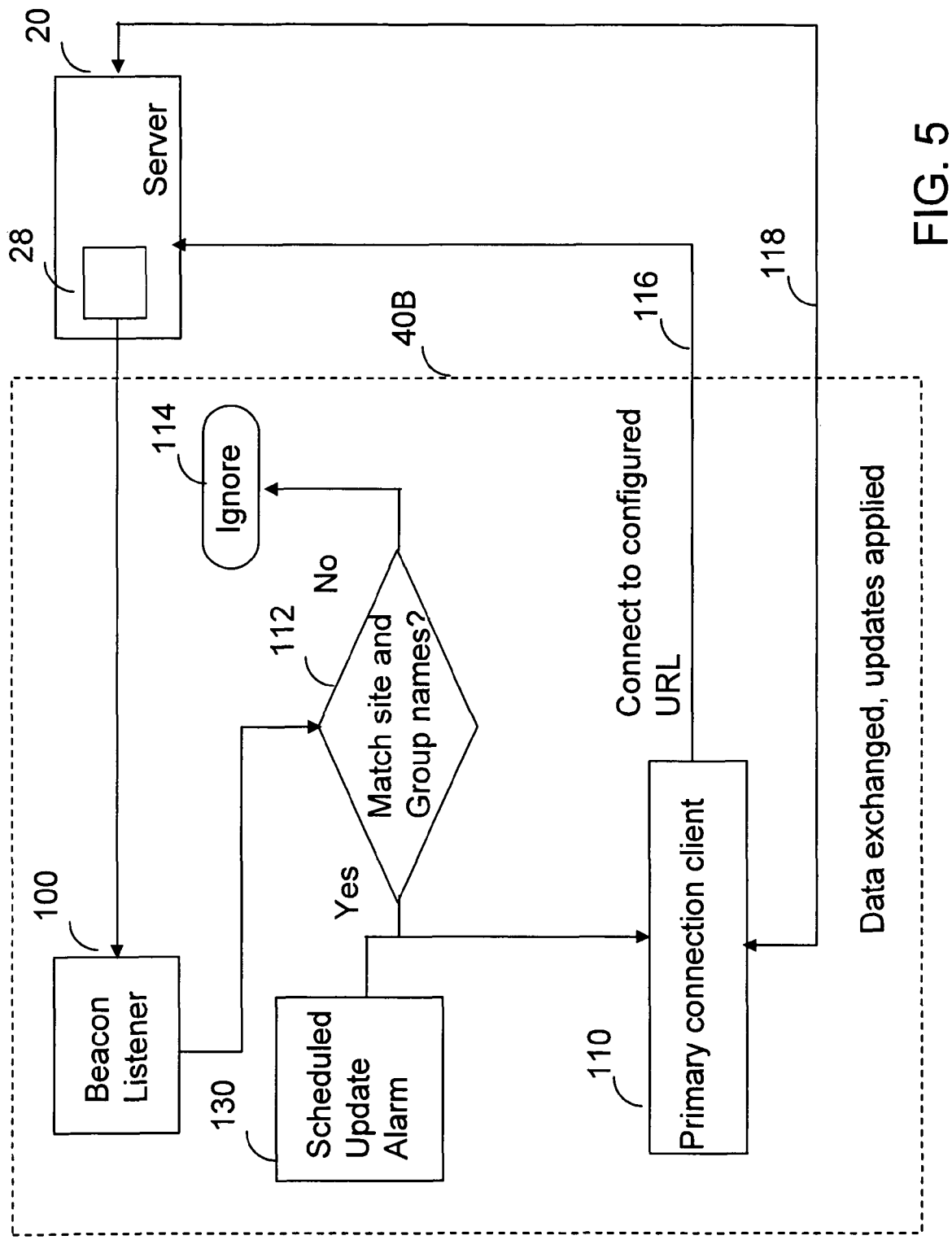
FIG. 5 is a schematic diagram showing an example of an update process in the network of FIG. 2.

Full path is stored in the registry in the client terminal 40A (e.g., 46 of FIG. 2). The client terminal 40A stores information extracted from the discovery beacon for next connection for updates (FIG. 5).

The client terminal 40A establishes an initial connection to the URL provided in the discovery beacon (106). Once the server 20 receives the connection, the client terminal 40A is discovered. The server 20 is now aware of the client terminal 40A (108). Data can be exchanged between the server 20 and the client terminal 40A (108). The client terminal 40A may make a call to the URL to transfer, to the server, information such as serial number, model, OS, etc.

After step 106, the server 20 assigns the client terminal 40A to a group(s) identified by Group ID(s). This is done, for example, based on terminal type and operational system (OS) version of the client terminal 40A. The server 20 sends the Group ID(s) to the client terminal at step 108. The server 20 may assign the permanent server URL used for future connections. The server 20 may assign the update schedule (e.g., update period) for connecting back to the server 20 (e.g., 48 of FIG. 2, 130 of FIG. 5). The server 20 may send the update schedule and permanent server URL to the client terminal at step 108. Additional components are then installed or updated to the protocol defined in the primary connection client 110.

In FIG. 4, the client terminal 40A connects to the server 20. However, the URL provided by the server 20 may be directed to another server.

The client terminal 40A may detect another new discovery beacon from the server 20, which has a new URL. Once the client terminal 40A detects the new discovery beacon, the client terminal 40A will establish a connection with the new URL and obtain a Group ID(s).

If the client terminal 40A has been already discovered in the network at step 102, the client terminal 40A has a configured Group ID at step 102. If the client terminal 40A has a configured Group ID at step 102 and the detected beacon is a discovery beacon, the discovery beacon may be ignored at step 104.

Referring to FIG. 5, one example of a client update process using the update beacon is described in detail. In FIG. 5, "40B" refers to a client terminal that corresponds to the client terminal 40 of FIG. 2. One of ordinary skill in the art would appreciate that the client terminal 40B includes functionalities and elements not illustrated in FIG. 5. The server 20 transmits an update beacon to update discovered client terminals in a group.

In FIG. 5, a connection between the server 20 and the client terminal 40B is established either by the beacon listener 100 receiving an update beacon or a scheduled update alarm 130 occurring. The scheduled update alarm 130 is occurred and identified by, for example, the event identifier 48 of FIG. 2. The update beacon sent out by the server 20 is detected by the beacon listener 100.

It is assumed that the client terminal 40B has been discovered by the server 20 through the discovery process (FIG. 4) and the client terminal 40B has a configured Group ID(s) at step 112. The client terminal 40B checks whether this beacon is an update beacon for this client terminal from the server 20. In one example, this is determined by checking Site ID and Group ID in the detected beacon whether the Site ID and Group ID in the beacon are the same as those assigned to the client terminal 40B.

If the detected beacon is not an update beacon for this client terminal, it ignores the detected beacon (114). If the client terminal 50B has already responded to the same beacon, it ignores the detected beacon (114).

If the client terminal 40B determines that the detected beacon is an update beacon for this client terminal, it invokes the primarily connection client (110) with the previously configured URL (116). The primary connection client (110) is launched without a server URL. The client terminal 40B re-uses a previously used server URL. Also the primary connection client (110) is invoked based on the scheduled update alarm 130. The server 20 and the primary connection client (110) exchange data and any required updates will be applied.

If the client terminal 40B has not been discovered in the network at step 112, the client terminal 40B does not have a configured Group ID(s) at step 112. If the client terminal 40B does not have a configured Group ID at step 112 and the detected beacon is an update beacon, the update beacon may be ignored at step 114.

In the above example, the discovery process of FIG. 4 and the update process of FIG. 5 are illustrated separately. However, it would be appreciated by one of ordinary skill in the art that the discovery process of FIG. 4 and the update process of FIG. 5 may be integrated or executed parallelly.

Figure 6:
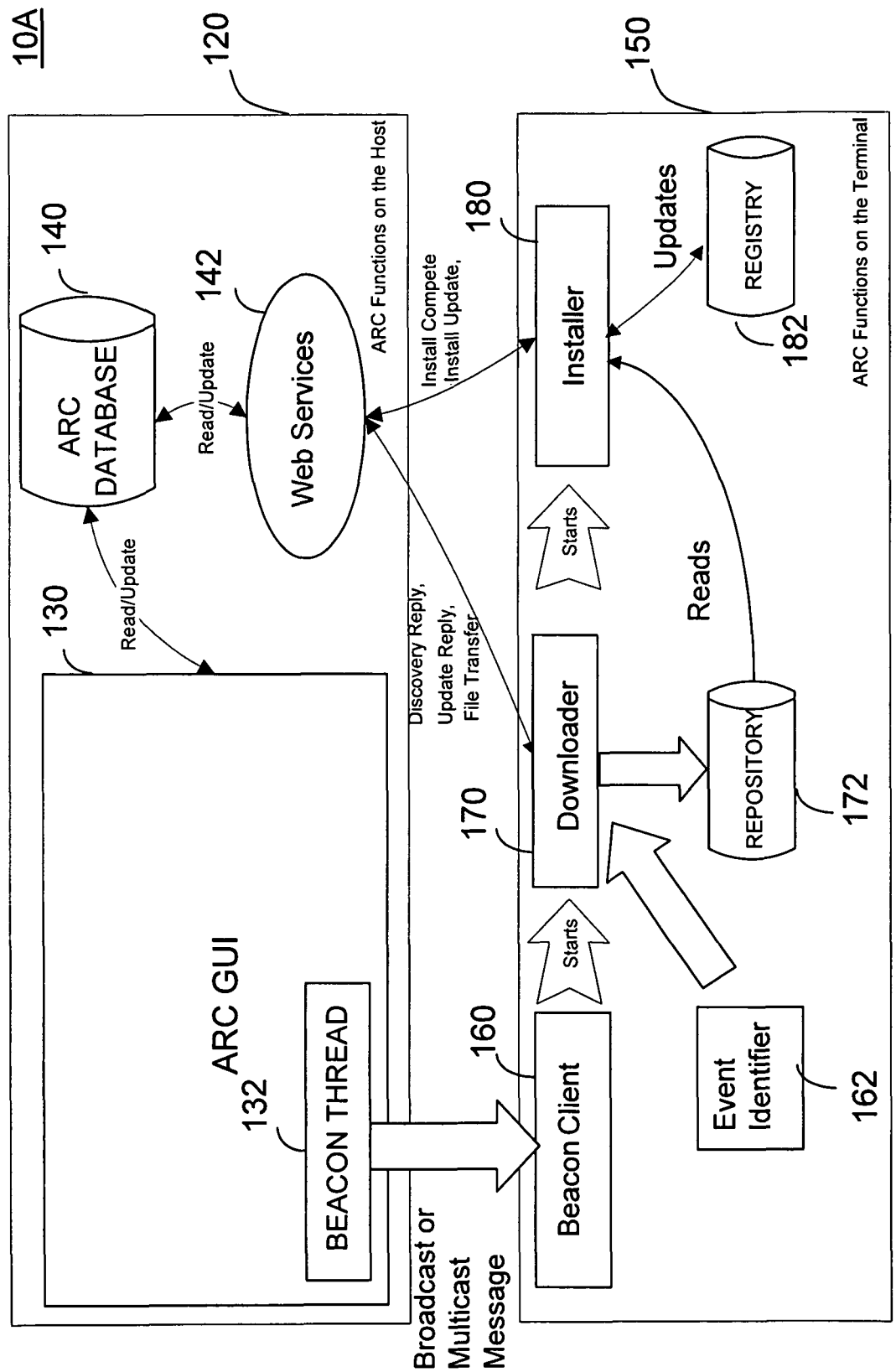
FIG. 6 is a schematic block diagram showing an example of the server and the client of FIG. 2.

FIG. 6 illustrates one example of the network system 10 of FIG. 2. The network system 10A of FIG. 6 includes a server 120 and a client terminal 150. The server 120 of FIG. 6 corresponds to the server 20 of FIG. 2. The client terminal 150 of FIG. 2 corresponds to each of the client terminal 40 of FIG. 2.

A visual User Interface (GUI) 130 in the server 120 corresponds to GUI 22 of FIG. 2, and supports various functionalities, for example, client terminal and group maintenance, component maintenance, beacon configuration including start/stopping a beacon thread 132. A database 140 in the server 120 corresponds to the database 24 of FIG. 2 and is used to manage the network, including, for example, but not limited to, client terminals, groups components or data transmitted to the client terminal 150. A Web service module 142 in the server 120 corresponds to the Web service module 26 of FIG. 2, and provide various services to the client terminals.

A beacon client 160 in the client terminal 150 corresponds to the beacon client 42 of FIG. 2. The beacon client 160 detects the invitation beacons from the server 120 and launches a downloader 170 for connections with the server. The beacon client 160 includes a beacon listener that is always active and is responsible for launching the downloader 170 when a beacon indicates that that client terminal 150 should connect to the server 120.

The downloader 170 is responsible for connecting to the server 120 (e.g., replying to the discovery beacon and the update beacon), exchanging data with the server 120, and downloading components from the server 120 according to the instructions of the server 120. The downloader 170 uses the URL specified in the discovery beacon to establish an initial connection with the server 120. The downloader 170 synchronizes with the server 120 via Web services 142. The components and data from the server 120 may be transferred to a repository 172.

The event identifier 162 of the client terminal 150 detects some events, which include, for example, but not limited to, a scheduled event (alarm), a docking event, power on etc. The event identifier 162 launches the downloader 170 when detecting the events. The scheduled event may be set by the client terminal 150 or the server 120. For example, an updating period is assigned by the server 120 so that the client terminal 150 connects back to the server 120 at a certain timing. The scheduled event is detected, for example, by a timer in the event identifier 162.

When the downloader 170 finishes the downloading, the downloader 170 may launch an installer 180 for installing components downloaded. The installer 180 is responsible for doing the actual component install and reporting progress to the server 120. This involves copying files, launching setup to execute installation scripts, and performing post install actions. The installer 180 processes downloaded commends and reports success/failure via the Web services 142 on a component by component basis. When completed, it transfers the details install log file for the terminal 150 back to the server 120 through the Web services 142. The installer 180 updates a registry component 182 that contains configuration information.

One of ordinary skill in the art would appreciate that the server 120 includes functionalities and elements not illustrated in FIG. 6. One of ordinary skill in the art would appreciate that the client terminal 150 includes functionalities and elements not illustrated in FIG. 6.

What is claimed is:

1. A method for a server-client communication in a network having one or more servers including discoverable services, comprising, at a server:
   requesting a client for using said discoverable services, to establish an initial connection for discovery, including:
     generating an initial discovery beacon for requesting the initial connection, and transmitting the discovery beacon in the network, said initial discovery beacon being unrequested by any other beacon;
   assigning to the discovered client, a scheduled event for triggering a further connection for update of the discovered client, including:
     assigning a time period to the discovered client when the client is discovered;
   generating an update beacon requesting the discovered client to establish the further connection for update of the discovered client, the discovered client connecting back to the server in the assigned time period; and
   transmitting the update beacon in the network.

2. A method as claimed in claim 1, comprising, at the server:
   assigning a group to the discovered client; and
   administering the group, the group having one or more than one discovered client in the network.

3. A method as claimed in claim 2, wherein the step of administering comprises at least one of:
   creating the group;
   modifying the group; and
   deleting the group.

4. A method as claimed in claim 2, wherein the step of generating an update beacon comprises:
   generating the update beacon for the group.

5. A method as claimed in claim 1, wherein the step of discovering comprises:
   assigning the client to the server so that the client responds to the discovery and update beacons from the assigned server.

6. A method as claimed in claim 1, comprising, at the server:

providing URL to the client to establish the initial connection or the initial connection and the further connection.

7. A method as claimed in claim 6, wherein the step of providing comprises:
providing the URL to the client through the discovery beacon to establish the initial and further connections.

8. A method as claimed in claim 1, wherein the beacon comprises at least one of:
a message ID for identifying the beacon to prevent the client from responding to the same beacon repeatedly;
a site ID for identifying the server to allow the client to respond to the discovery and update beacons from the server;
a group ID for identifying a group, the group having one or more than one discovered client in the network;
a locater for locating a server for the establishment of the connection.

9. A method as claimed in claim 8, wherein the discovery beacon comprises the locator for establishing the initial and further connections.

10. A method as claimed in claim 1, wherein the step of transmitting comprises at least one of:
broadcasting the beacon;
multicasting the beacon; and
repeatedly transmitting the beacon.

11. A method as claimed in claim 1, wherein said discoverable services include an updating service and the updating comprises provisioning and configuring the discovered client.

12. A method for a server-client communication in a network having one or more servers including discoverable services, comprising, at a client for using said discoverable services:
for discovery, detecting an initial discovery beacon from a server for establishing an initial connection, said initial discovery beacon being unprompted by any other beacon, and establishing the initial connection, a time period being assigned to the client by the server when the client is discovered by the server, and
for update of the client, detecting at least one of an update beacon from the server for establishing a further connection and a scheduled event assigned by the server for establishing the further connection, and establishing the further connection in the assigned time period.

13. A method as claimed in claim 12, wherein the client is assigned to a group, and wherein the step of detecting an update beacon comprises detecting the update beacon for the group assigned to the client.

14. A method as claimed in claim 12, wherein the client is assigned to the server, and wherein the step of detecting an update beacon comprises detecting the update beacon from the assigned server.

15. A method as claimed in claim 12, comprising, at the client:
receiving URL from the server for the initial connection, or the initial and further connections.

16. A method as claimed in claim 15, wherein the step of receiving comprises:
extracting the URL from the discovery beacon for the initial and further connections.

17. A method as claimed in claim 12, comprising, at the client:
determining whether the same beacon is received more than one time; and
ignoring the beacon when the same beacon is received more than one time.

18. A method as claimed in claim 12, wherein the beacon comprises at least one of:
a message ID for identifying the beacon to prevent the client from responding to the same beacon repeatedly;
a site ID for identifying the server to allow the client to respond to the discovery and update beacons from the server;
a group ID for identifying a group, the group having one or more than one discovered client in the network;
a locater for locating a server for the establishment of the connection.

19. A method as claimed in claim 18, wherein the discovery beacon comprises the locator for establishing the initial and further connections.

20. A server system comprising:
an invitation unit including discoverable services for generating and transmitting an initial discovery beacon for discovering a new client for using said discoverable services, in a network, said initial discovery beacon being unprompted by any other beacon, assigning, to the discovered client, a scheduled event for triggering a further connection for update of the discovered client, and generating and transmitting in the network, and update beacon for requesting the further connection for updating the discovered client; and
an administration unit for administering the discovered client and including discoverable services, including at least one of:
assigning a time period to the discovered client such that the discovered client connects back to the server in the time period;
assigning the discovered client to a group; and
assigning the server to the client to allow the client to respond to the discovery and update beacons from the assigned server.

21. A server system as claimed in claim 20, comprising:
a graphic user interface for controlling the invitation unit and the administration unit.

22. A client system comprising:
a beacon client for detecting an invitation beacon from a server including discoverable services, the invitation beacon including an initial discovery beacon for discovery and an update beacon for updates, said initial discovery beacon being unprompted by any other beacon, said client for using said discoverable services;
an event identifier for detecting a scheduled event for the updates of the discovered client, the scheduled event being assigned by the server;
a primary connection client for establishing an initial connection in response to the discovery beacon and establishing a further connection in response to at least one of the update beacon and the event in a time period, the time period being assigned by the server when the client is discovered by the server.

23. A client system as claimed in claim 22, wherein the client is assigned to a group, and the beacon client comprises means for detecting the update beacon for the group assigned to the client.

24. A client system as claimed in claim 22, wherein the client is assigned to the server, and wherein the beacon client comprises means for detecting the update beacon from the assigned server.

* * * * *